United States Patent [19]

Brindöpke

[11] Patent Number: 5,075,005
[45] Date of Patent: Dec. 24, 1991

[54] FILTER APPARATUS FOR PRODUCING AROMATIC EXTRACTS

[75] Inventor: Dieter Brindöpke, Minden, Fed. Rep. of Germany

[73] Assignee: Melitta Haushaltsprodukte GmbH & Co. KG, Minden, Fed. Rep. of Germany

[21] Appl. No.: 641,270

[22] Filed: Jan. 14, 1991

[30] Foreign Application Priority Data

Jan. 13, 1990 [DE] Fed. Rep. of Germany ....... 4000881

[51] Int. Cl.⁵ .......................................... B01D 29/085
[52] U.S. Cl. .................................. 210/477; 210/482; 210/493.3; 210/493.5; 210/497.2; 426/77; 99/295
[58] Field of Search ............................. 426/77; 99/295; 210/477, 478, 479, 481, 482, 493.5, 497.3, 473, 474, 493.1, 497.01, 497.2

[56] References Cited

U.S. PATENT DOCUMENTS

| | | | |
|---|---|---|---|
| 2,835,191 | 5/1958 | Clurman | 210/474 |
| 2,896,788 | 7/1959 | Hoffberger | 210/477 |
| 3,334,574 | 8/1967 | Douglas | 210/474 |
| 3,695,167 | 10/1972 | Schmidt et al. | 426/77 |
| 3,861,975 | 1/1975 | Hauslein | 210/474 |
| 4,895,656 | 1/1990 | Smit | 210/497.3 |

FOREIGN PATENT DOCUMENTS 2221831 5/1972 Fed. Rep. of Germany .
8712709 3/1988 Fed. Rep. of Germany .

OTHER PUBLICATIONS

Random House College Dictionary, Random House Inc., New York, 1980 revised edition, p. 130.

Primary Examiner—Robert A. Dawson
Assistant Examiner—Wanda L. Millard
Attorney, Agent, or Firm—Spencer & Frank

[57] ABSTRACT

A filter apparatus for producing aromatic extracts of coffee or tea includes a filter vessel having an interior with a pyramid-like shape and a filter paper insert which, in use, is adapted in shape to the interior of the filter vessel. In order to improve the utilization of the aroma carrier, the corners of the filter vessel in the usable interior are beveled or otherwise altered. The filter paper insert is correspondingly provided with creases in its corner regions so as to permit a substantially form-fitting support of the filter paper insert at the beveled corners of the filter vessel.

19 Claims, 6 Drawing Sheets

FILTER APPARATUS FOR PRODUCING AROMATIC EXTRACTS

CROSS REFERENCE TO RELATED APPLICATION

This application claims the priority of Federal Republic of Germany Application Serial Number P 40 00 881.9, filed Jan. 13, 1990, the subject matter of which is incorporated herein by reference.

BACKGROUND OF THE INVENTION

The present invention relates to a filter apparatus for producing aromatic extracts of coffee or tea. More particularly, the invention relates to a filter apparatus of the type which includes a filter vessel and a filter paper insert adapted to the filter vessel, with the interior of the filter vessel and thus of the filter paper insert having a pyramid-like shape when in use.

A filter apparatus of this type is disclosed in German Patent 2,221,831.

In addition to this prior art filter apparatus, there exist other basic structures for producing aromatic extracts from coffee or tea.

For example, conical filters which are used primarily in the home are known. Due to their configuration, the capacity of such conical filters is limited, so that using such conical filters commercially, where the required capacity is large, is impractical for reasons of space.

Additionally, there exist the so-called basket filters which are employed in the home as well as commercially. Although the filter paper inserts for such basket filters can be manufactured relatively easily, they have the drawback that they are not very stable in form and must be stacked on top of one another, which makes the use of such filter paper inserts awkward. Another drawback of this type of structure is that the water distributors employed must be designed with broad faces, since otherwise it would not be possible to fully utilize the aroma carrier (e.g., coffee or tea). The aroma carrier is used inefficiently in any case if a small amount is brewed with the aid of a basket filter, since only a relatively small quantity of the aroma carrier is distributed over the large area available.

Experience has shown that such basket filters are also very sensitive to differences in the quality of the water, particularly with respect to the effective filtration period. The shower head-like water distributors required ar susceptible to calcium deposits and soiling.

So-called flat filters are also known. However, essentially the same drawbacks apply as for the so-called basket filters.

Moreover, filter apparatuses of the generic type disclosed in German Patent 2,221,831 have a number of advantages.

For example, the manufacture of filter paper inserts for such filter apparatuses is rather simple, as indicated in German Patent 2,221,831. The capacity of such filter apparatuses is also very large with a sufficiently large effective filtering surface, so that filter apparatuses of this type can be used commercially without difficulty. The utilization efficiency of the aroma carriers in such filter apparatuses is very good, regardless of whether the individual brewing charges are small or large, since even with small brewing charges the aroma carrier is very well centered in the region of the pyramid apex.

The water intake for such filter apparatuses may have a very simple configuration. For example, it may simply be the outlet opening of a corresponding overflow pipe, so that the water intake of such filter apparatuses is extremely resistant to calcium deposits and soiling.

Since the filter vessels of such filter apparatuses are generally equipped with ribs on which the filter paper inserts are supported, the generation of a subatmospheric pressure between a filter paper insert and the walls of the filter vessel may produce a certain suction effect which accelerates the filtration process.

Therefore, such filter apparatuses devices are also called quick filters.

The filter paper inserts themselves may be packaged in a flat state. Consequently no problems arise in connection with their stability in form and the ease of manipulation of the filter paper inserts.

However, it has also been found that, particularly in connection with large brewing charges, the aroma carrier cannot be utilized with optimum efficiency in the corner regions of the prior art filter apparatuses.

SUMMARY OF THE INVENTION

It is therefore an object of the present invention to improve the filter apparatus of the above-defined type so that the aroma carrier is optimally utilized without sacrificing the basic advantages of such a filter apparatus.

This is accomplished by the present invention in that the corners of the filter vessel in the usable interior are beveled or otherwise altered, and in that the corner regions of the filter paper insert are provided with additional creases so as to permit a substantially form-fitting contact of the filter paper insert at the beveled corners of the filter vessel.

This comparatively easy measure ensures a considerably improved utilization of the aroma carrier that is almost optimum for practical purposes, with the basic pattern of the filter paper inserts and their known advantages being retained. It is merely necessary to apply the additional creases.

According to a feature of the invention, the filter paper insert, when in its position of use, has a frustopyramidal shape, with the ratio of the smaller base face to the larger base face lying approximately in a range of 1:10.

Such a configuration is of particular advantage if the filter vessel corresponding to the filter paper insert has a frustopyramidal interior. This results in a comparatively low structural height for the filter apparatus without incurring the drawbacks of, for example, the known basket filters or flat filters.

However, filter paper inserts having a frustopyramidal shape can also be employed if the filter vessel has a pyramid-like interior and is used with an adaptor. The adaptor is inserted into the tip of the filter vessel and itself has a pyramid shape, with the frustopyramidal filter paper insert being supported on the base face of the adapter.

This means that prior art filter vessels can continue to be used in conjunction with appropriately shaped new filter paper inserts, with it merely being necessary to insert a corresponding adapter.

DESCRIPTION OF THE PREFERRED EMBODIMENTS

Figure 1:
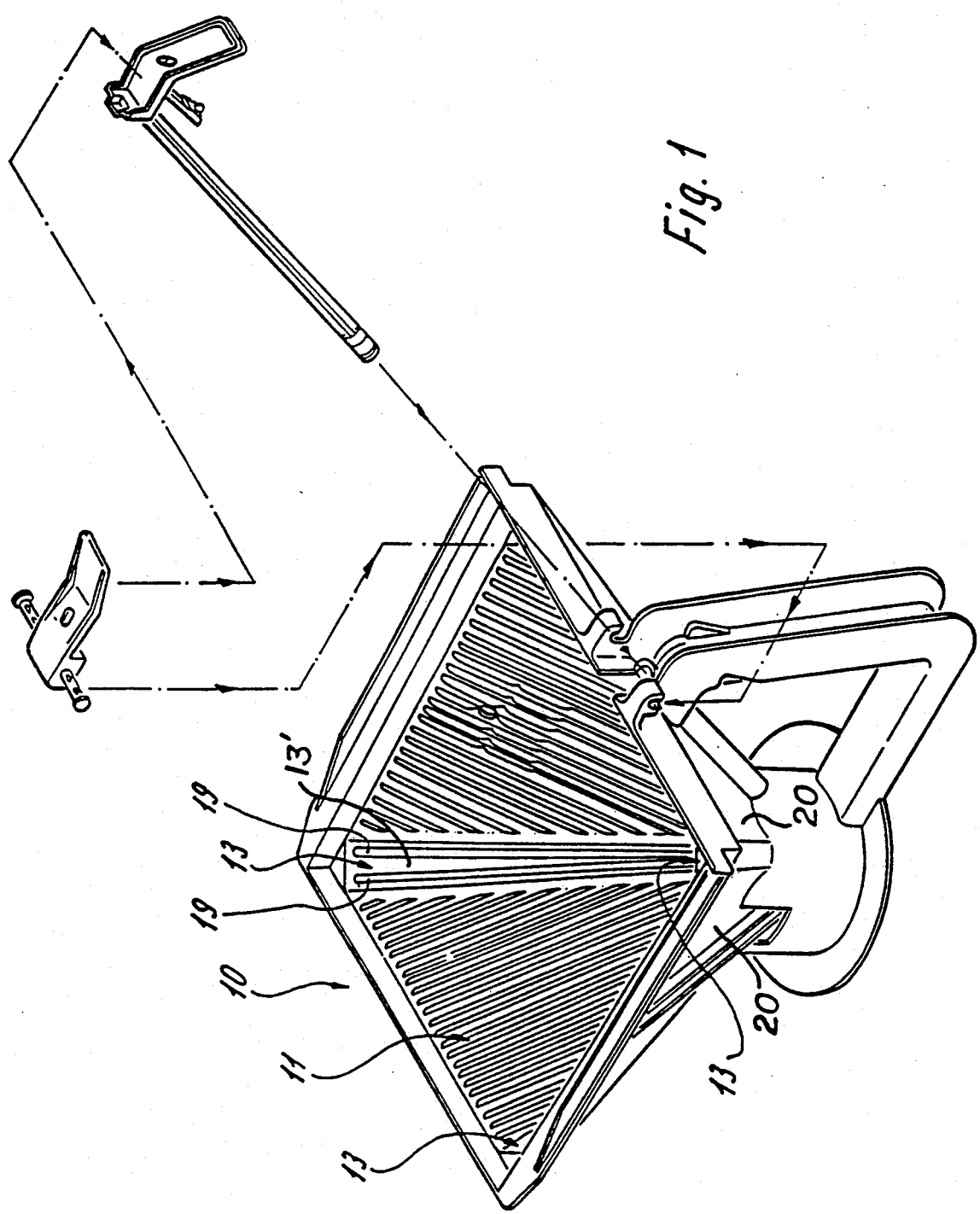
FIG. 1 is an exploded perspective view of the filter vessel of a filter apparatus according to the invention.
Figure 3:
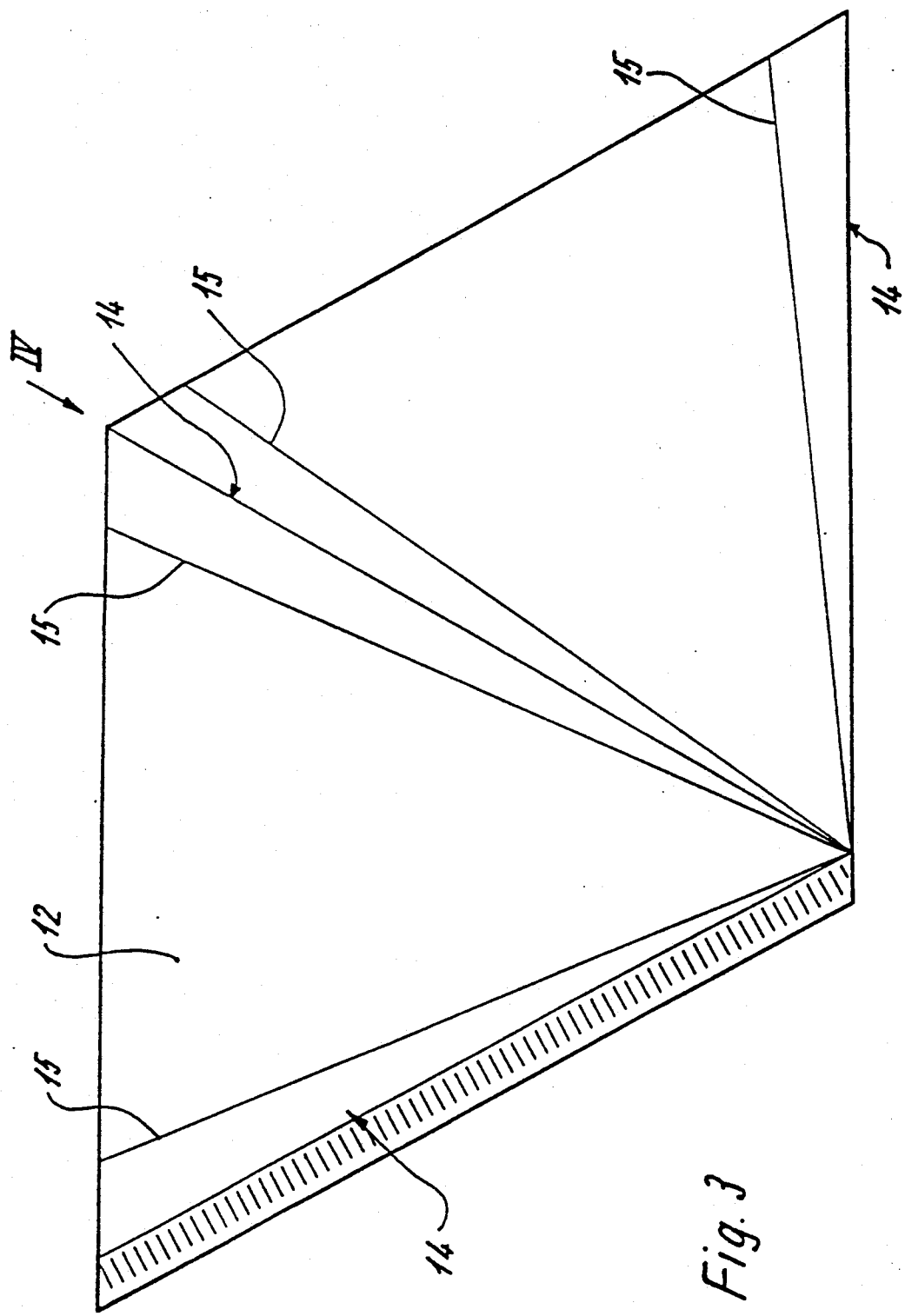
FIG. 3 shows a flattened filter paper insert for a filter vessel according to FIG. 1.

The filter vessel shown in FIG. 1 in a perspective view and generally given the reference numeral 10 is part of a filter apparatus for the production of aromatic extracts of coffee or tea. Filter vessel 10 includes a usable interior 11 whose shape is essentially similar to a pyramid. A filter paper insert 12 as shown in FIG. 3 is inserted into the interior 11. The filter vessel 10 in conjunction with the inserted filter paper insert 12 form an operational filter apparatus for producing aromatic extracts of coffee or tea.

Figure 4:
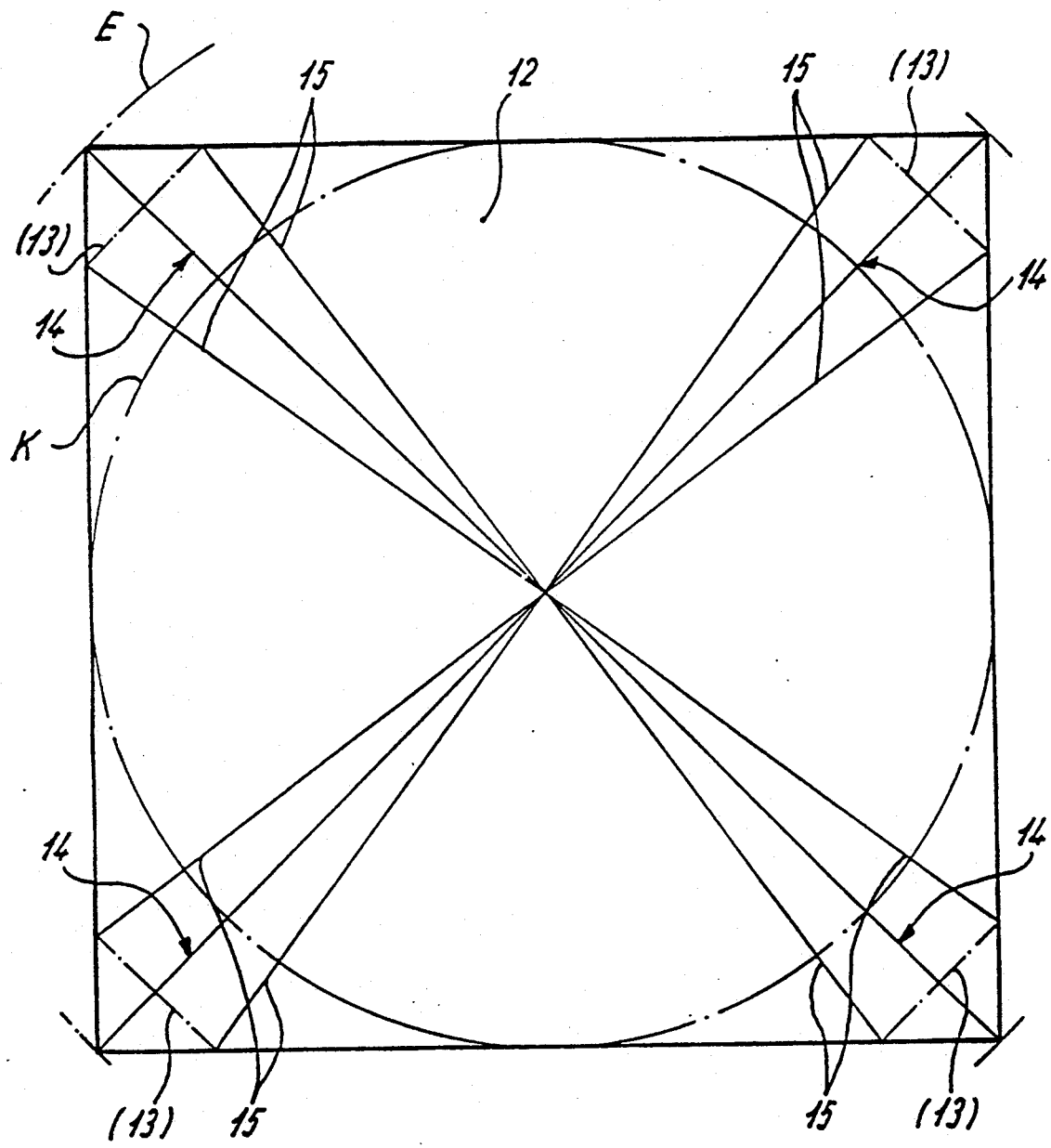
FIG. 4 is a view, in the direction of arrow IV in FIG. 3, of a filter paper insert which has been unfolded into the use position, with dot-dash lines in the corner regions indicating the contact of the filter paper insert in the filter vessel.

As is shown in FIG. 1, the four major walls or pyramidal sides 20 of filter vessel 10 do not meet at sharp, 90° corners inside the filter vessel 10, but are instead joined by minor walls or wall portions 13' which are disposed at 135° angles (in a plane perpendicular to the pyramid axis) with respect to the adjacent major pyramidal sides. This provides truncated or beveled corners 13 which form corresponding support surfaces for a filter paper insert 12. As is shown in FIG. 3 and 4, at its corner regions 14, which are supported at the beveled corners 13 when the filter apparatus is in use, the filter paper insert 12 is provided with additional creases 15. These creases 15 make it possible to support filter paper insert 12 essentially in a form fitting manner at the beveled corners 13 of filter vessel 10. Due to this support at the corner regions, the utilization of the aroma carrier in the operational filter apparatus is improved considerably and made almost perfect for practical purposes.

The pattern of a strictly pyramid-like filter paper insert can be maintained since merely the additional creases 15 need be made to provide the support at the beveled corners 13.

Figure 2:
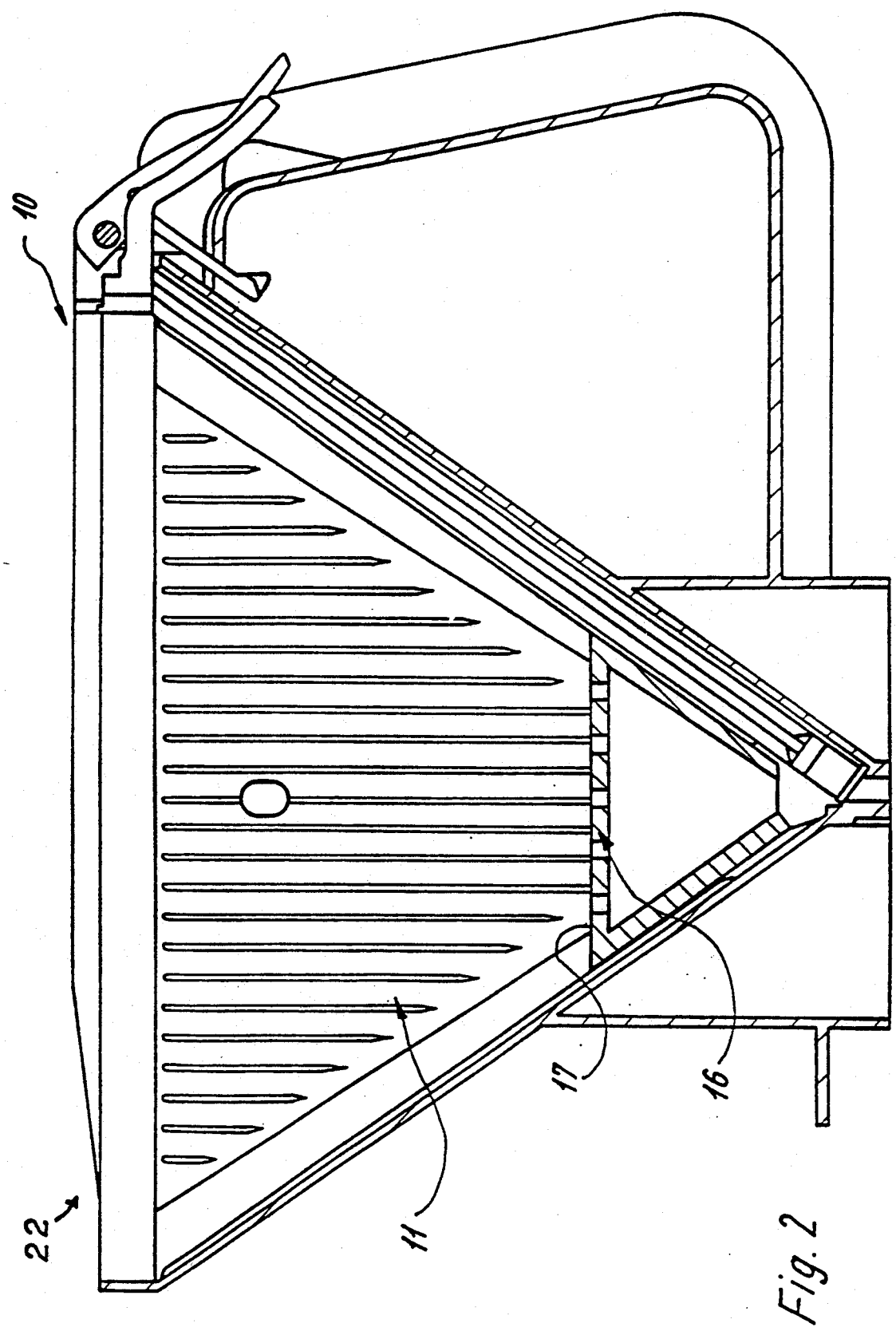
FIG. 2 is a vertical sectional view of the filter vessel of FIG. 1 showing an adapter inserted into the apex of its interior.

FIG. 2 shows that an adapter 16 which itself has the shape of a pyramid and which can be inserted into the apex of the pyramid-like usable interior 11 of filter vessel 10. The base face 17 of adapter 16 serves to support a filter paper insert 12a as shown in FIG. 5.

Figure 5:
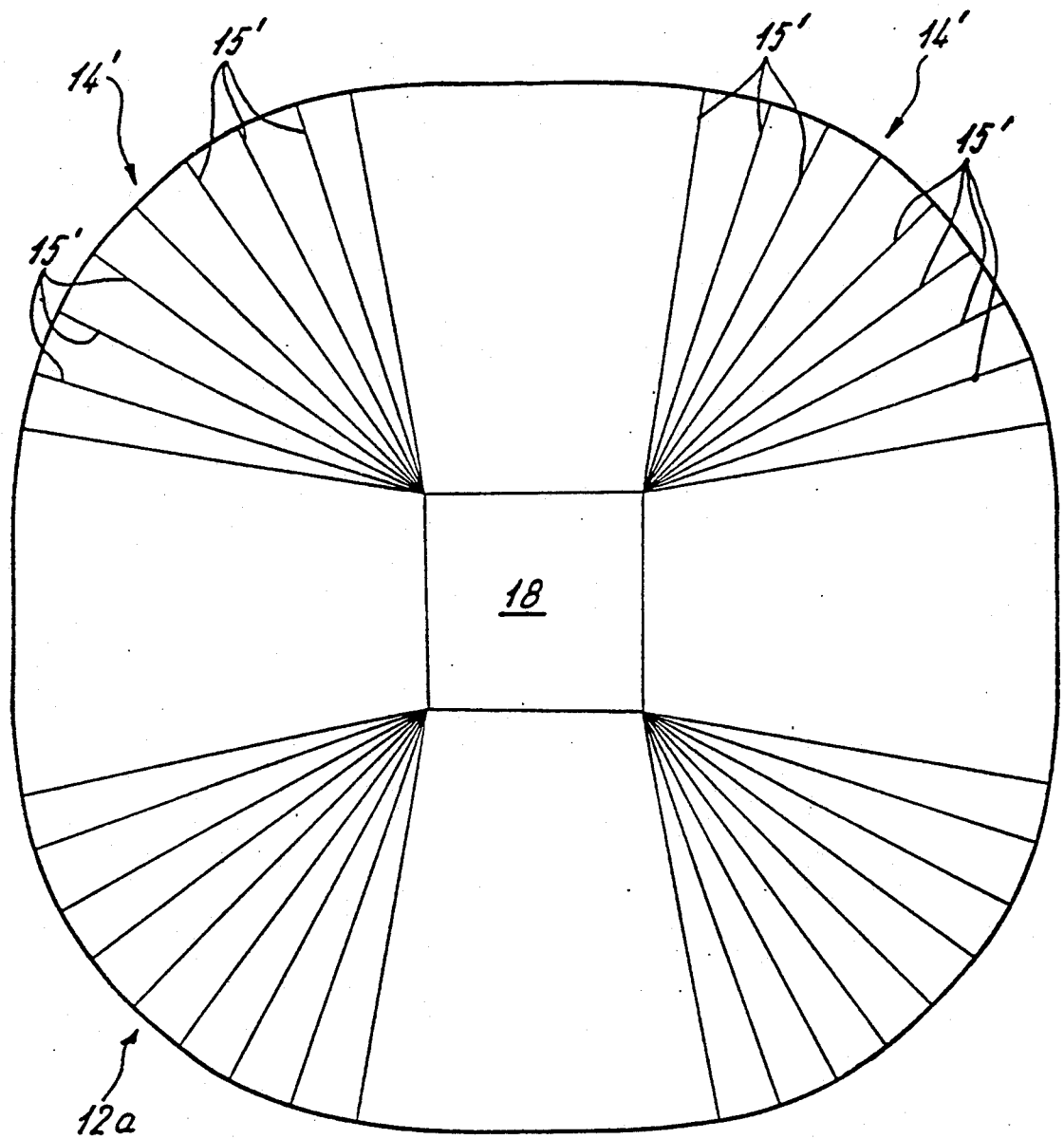
FIG. 5 shows a flat filter paper insert for the filter vessel of FIG. 2 with the corresponding adapter.

Filter paper insert 12a according to FIG. 5 can be folded upright from its illustrated, flat position into a frustopyramidal structure by a plurality of creases 15' in its corner regions 14'. The small base face 18 of this frustopyramidal filter paper insert 12 corresponds approximately to the size of base face 17 of adapter 16 of the filter vessel 10 shown in FIG. 2. Thus a frustopyramidal filter paper insert 12a can always be completely supported on all sides in filter vessel 10.

The ratio between the small base face 18 of filter paper insert 12a and its larger base face when in the position of use lies approximately in a range of 1:10. In other words, and with reference to FIG. 2, the area of base face 17 is around one tenth of the area of a horizontal cross-section of interior 11, taken at the mouth 22 of filter vessel 10.

If, in conjunction with a frustopyramidal filter paper insert 12a as shown in FIG. 5, it is desired to reduce the structural height of the entire filter apparatus, a filter vessel (not illustrated) whose interior 11 has already been constructed to have a frustopyramidal shape can be used. The structural height of the adapter 16 shown in FIG. 2 would then not contribute to the overall structural height.

It has been found to be advisable for the size of the wall portions 13' of the beveled corners 13 of filter vessel 10 be selected so that the wall portions 13' are positioned approximately mid-way between the original corner dimension and a circle inscribed in filter vessel 10.

Figure 6:
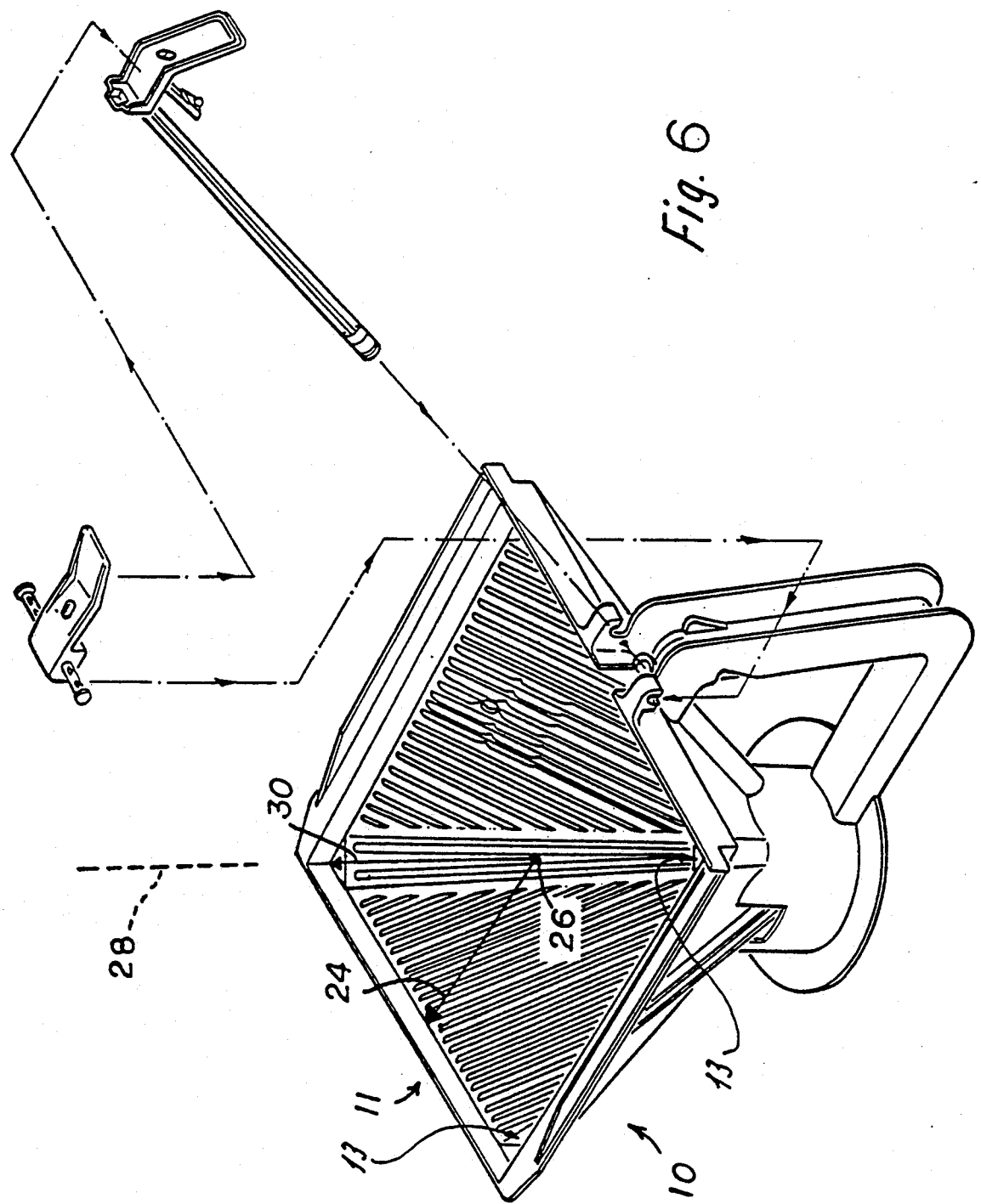
FIG. 6 is an exploded perspective view of the filter vessel as shown in FIG. 1, but with additional relationships marked as an aid to describing the beveled corners.

In FIG. 4, dash-dot lines indicate the above-described relationship. The inscribed circle is marked K, and a circle at the original corner dimension is marked E. In FIG. 6 the arrow 24 indicates the radius of the inscribed circle K of FIG. 4, the radius being taken from a point 26 along the axis 28 of the pyramid, while the arrow 30 indicates the radius of the circle E from the point 26 to an original corner dimension (i.e., if the corners 13 were sharp instead of beveled. It is clear that the beveled corners 13 lie approximately mid-way between these two demarkation values.

Filter vessel 10 is advantageously also provided wit ribs 19 (FIG. 1) in the region of its beveled corners 13 so that the sloping of filter vessel 10 itself and the concomitant sloping of the filter paper insert do not result in a loss of effective filtering surface.

The shape of filter paper insert 12 according to FIGS. 3 and 4 has the advantage that the pattern for the conventional pyramid filter can be retained so that, if necessary, a newly configured filter paper insert 12 can also be employed for existing pyramid filters. This is very advantageous particularly with respect to economic manufacture of such filter paper inserts for different purposes.

It will be understood that the above description of the present invention is susceptible to various modifications, changes, and adaptations, and the same are intended to be comprehended within the meaning and range of equivalents of the appended claims.

What is claimed is:

1. A filter apparatus for producing aromatic extracts of coffee or tea, comprising:
   a filter vessel having a usable interior with a generally pyramid-like shape, the interior of the filter vessel having corner regions that are truncated, the corner regions being located approximately in a middle range between a circle inscribed within the cross-sectional area of the vessel interior and a concentric circle that would pass through the corners of the vessel interior if the corners were sharp rather than truncated; and
   a filter paper inserted which is received in the interior of the filter vessel and which conforms to the generally pyramid-like shape of the interior during use, the filter paper insert having corner regions and crease means at the corner regions for permitting substantially form-fitting contact of the filter paper insert at the truncated corner regions of the interior of the filter vessel.

2. The filter apparatus of claim 1, wherein the filter vessel further comprises ribs on the truncated corner regions to support the filter paper insert.

3. The filter apparatus of claim 1, wherein the filter paper insert is shaped substantially as a pyramid with an apex when in use, except at the truncated corner regions of the filter vessel interior, and can be folded together so as to be flat prior to use.

4. The filter apparatus of claim 1, wherein the filter vessel interior has an axis, and wherein the filter vessel comprises four substantially flat major walls with ribs on them and four substantially flat minor walls with ribs on them, each minor wall being connected between a pair of adjacent major walls and being disposed at an angle of approximately 135°, in a plane perpendicular to the axis, with respect to both of the adjacent major walls, the truncated corner regions of the interior of the filter vessel being provided by the minor walls.

5. A filter apparatus for producing aromatic extracts of coffee or tea, comprising:
a filter vessel having a usable interior with a generally frustopyramidal-like shape, the interior of the filter vessel having corner regions that are truncated, the corner regions being located approximately in a middle range between a circle inscribed within the cross-sectional area of the vessel interior and a concentric circle that would pass through the corners of the vessel interior if the corners were sharp rather than truncated; and
a filter paper insert which is received in the interior of the filter vessel and which conforms to the generally frustopyramidal-like shape of the interior during use, the filter paper inserts having corner regions and crease means at the corner regions for permitting substantially form-fitting contact of the filter paper insert at the truncated corner regions of the interior of the filter vessel.

6. The filter apparatus of claim 5, wherein the filter vessel comprises a vessel member having a usable interior with a generally pyramid-like shape, the vessel member having a bottom portion, and a generally pyramid-shaped adapter in the bottom portion of the filter vessel interior.

7. The filter apparatus of claim 5, wherein the filter vessel further comprises ribs on the truncated corner regions to support the filter paper insert.

8. The filter apparatus of claim 5, wherein the filter vessel interior has an axis, and wherein the filter vessel comprises four substantially flat major walls with ribs on them and four substantially flat minor walls with ribs on them, each minor wall being connected between a pair of adjacent major walls and being disposed at an angle of approximately 135°, in a plane perpendicular to the axis, with respect to both of the adjacent major walls, the truncated corner regions of the interior of the filter vessel being provided by the minor walls.

9. A filter apparatus for producing aromatic extracts of coffee or tea, comprising:
a filter vessel having a usable interior with a generally pyramid-like shape, the interior of the filter vessel having corners that are beveled; and
a filter paper insert which is received in the interior of the filter vessel, the filter paper insert having corner regions and crease means at the corner regions for permitting substantially form-fitting contact of the filter paper insert at the beveled corners,
wherein the filter paper insert has a position for use and a frustopyramidal shape in its position for use, the frustopyramidal shape having a first base face and a second base face that is larger than the first base face, the ratio of the first base face to the second base face lying approximately in the range of 1:10.

10. The filter apparatus of claim 9, wherein the generally pyramid-like shape of the filter vessel interior has a bottom portion, and further comprising a generally pyramid-shaped adapter in the bottom portion of the filter vessel interior, the adapter having a base face which supports the filter paper insert.

11. The filter apparatus of claim 9, wherein the filter vessel interior has an axis, and wherein the filter vessel comprises four substantially flat major walls with ribs on them and four substantially flat minor walls with ribs on them, each minor wall being connected between a pair of adjacent major walls and being disposed at an angle of approximately 135°, in a plane perpendicular to the axis, with respect to both of the adjacent major walls, the beveled corners of the interior of the filter vessel being provided by the minor walls.

12. A filter apparatus for producing aromatic extracts of coffee or tea, comprising:
a filter vessel having a usable interior with a generally pyramid-like shape, the interior of the filter vessel having corners that are beveled; and
a filter paper insert which is received in the interior of the filter vessel and which conforms to the generally pyramid-like shape of the interior during use, the filter paper insert having corner regions and crease means at the corner regions for permitting substantially form-fitting contact of the filter paper insert at the beveled corners,
wherein the generally pyramid-like shaped filter vessel interior has an axis and wherein, in a cross-section taken perpendicular to the axis, the beveled corners are disposed outside a first circle inscribed within the cross-sectional area of the vessel interior and inside a second circle that would pass through the corners of the filter vessel interior if the corners were sharp rather than beveled.

13. The filter apparatus of claim 13, wherein, in a cross-section taken perpendicular to the axis, the beveled corners are disposed approximately mid-way between the first and second circles.

14. The filter apparatus of claim 12, wherein the filter vessel comprises four substantially flat major walls with ribs on them and four substantially flat minor wall switch ribs on them, each minor wall being connected between a pair of adjacent major walls and being disposed at an angle of approximately 135°, in a plane perpendicular to the axis, with respect to both of the adjacent major walls, the beveled corners of the interior of the filter vessel being provided by the minor walls.

15. A filter apparatus for producing aromatic extracts of coffee or tea, comprising:
a filter vessel having a usable interior with a generally frustopyramidal-like shape, the interior of the filter vessel having corners that are beveled; and
a filter paper insert which is received in the interior of the filter vessel and which conforms to the generally frustopyramidal-like shape of the interior during use, the filter paper inserts having corner regions and crease means at the corner regions for permitting substantially form-fitting contact of the filter paper insert at the beveled corners,
wherein the frustopyramidal-like shape of the filter vessel interior has a first base face and a second base face that is larger than the first base face, the ratio of the first base face to the second base face lying approximately in the range of 1:10.

16. The filter apparatus of claim 15, wherein the filter vessel interior has an axis, and wherein the filter vessel comprises four substantially flat major walls with ribs on them and four substantially flat minor walls with ribs on them, each minor wall being connected between a pair of adjacent major walls and being disposed at an angle of approximately 135°, in a plane perpendicular to the axis, with respect to both of the adjacent major walls, the beveled corners of the interior of the filter vessel being provided by the minor walls.

17. A filter apparatus for producing aromatic extracts of coffee or tea, comprising:
 a filter vessel having a usable interior with a generally frustopyramidal-like shape, the interior of the filter vessel having corners that are beveled; and
 a filter paper insert which is received in the interior of the filter vessel and which conforms to the generally frustopyramidal-like shape of the interior during use, the filter paper inserts having corner regions and crease means at the corner regions for permitting substantially form-fitting contact of the filter paper insert at the beveled corners,
 wherein the generally frustopyramidal-like shaped filter vessel interior has an axis and wherein, in a cross-section taken perpendicular to the axis, the beveled corners are disposed outside a first circle inscribed within the cross-sectional area of the vessel interior and inside a second circle that would pass through the corners of the filter vessel interior if the corners were sharp rather than beveled.

18. The filter apparatus of claim 17, wherein, in a cross-section taken perpendicular to the axis, the beveled corners are disposed approximately mid-way between the first and second circles.

19. The filter apparatus of claim 17, wherein the filter vessel comprises four substantially flat major walls with ribs on them and four substantially flat minor walls with ribs on them, each minor wall being connected between a pair of adjacent major walls and being disposed at an angle of approximately 135°, in a plane perpendicular to the axis, with respect to both of the adjacent major walls, the beveled corners of the interior of the filter vessel being provided by the minor walls.

* * * * *